(12) United States Patent
Schäfer et al.

(10) Patent No.: US 7,866,288 B2
(45) Date of Patent: Jan. 11, 2011

(54) DEVICE FOR VARYING THE CONTROL TIMES OF AN INTERNAL COMBUSTION ENGINE

(75) Inventors: Jens Schäfer, Herzogenaurach (DE);
Mike Kohrs, Wilthen (DE)

(73) Assignee: Schaeffler KG, Herzogenaurach (DE)

( * ) Notice: Subject to any disclaimer, the term of this patent is extended or adjusted under 35 U.S.C. 154(b) by 607 days.

(21) Appl. No.: 11/794,187

(22) PCT Filed: Nov. 11, 2005

(86) PCT No.: PCT/EP2005/012096

§ 371 (c)(1),
(2), (4) Date: Jul. 10, 2007

(87) PCT Pub. No.: WO2006/074736

PCT Pub. Date: Jul. 20, 2006

(65) Prior Publication Data
US 2009/0120391 A1    May 14, 2009

(30) Foreign Application Priority Data
Dec. 23, 2004    (DE) .................... 10 2004 062 068

(51) Int. Cl.
*F01L 1/34* (2006.01)
(52) U.S. Cl. .............. 123/90.17; 123/90.15; 464/160
(58) Field of Classification Search ........... 123/90.15, 123/90.16, 90.17, 90.18; 464/1, 2, 160; 74/60
See application file for complete search history.

(56) References Cited

U.S. PATENT DOCUMENTS 2,699,690 A    3/1951    Kohler
3,085,451 A    4/1963    Morin
3,895,540 A    7/1975    Davidson
6,523,512 B2 *    2/2003    Axmacher et al. ....... 123/90.17

FOREIGN PATENT DOCUMENTS

| DE | 665 888 | 10/1938 |
|---|---|---|
| DE | 2 364 062 | 7/1974 |
| DE | 25 20 368 A1 | 11/1976 |
| DE | 199 34 161 A1 | 2/2001 |
| DE | 100 38 354 A1 | 2/2002 |
| DE | 102 22 475 A1 | 12/2003 |
| DE | 10 2004 038 681 A1 | 6/2006 |
| EP | 0 378 978 A | 7/1990 |
| FR | 2 286 984 A | 4/1976 |
| GB | 2 061 450 A | 5/1981 |

* cited by examiner

*Primary Examiner*—Ching Chang
(74) *Attorney, Agent, or Firm*—Charles A. Muserlian

(57) ABSTRACT

The invention relates to a device (1) for varying the control times of an internal combustion engine (100), having a driving wheel (12), a driven element (8) and a swashplate mechanism (2). The torque of a crankshaft (101) is transmitted by means of a primary drive to the driving wheel (12) and further by means of the swashplate mechanism (2) to the driven element (8) which is connected fixedly in terms of rotation to a camshaft (9).

The swashplate mechanism (2) is composed of at least one bevel wheel (3) and a swashplate (5) which is mounted on an adjusting shaft (15).

It is the aim of the invention to reduce the mass and the installation space of the device (1).

1 Claim, 4 Drawing Sheets

DEVICE FOR VARYING THE CONTROL TIMES OF AN INTERNAL COMBUSTION ENGINE

This application is a 371 of PCT/EP2005/012096 filed Nov. 11, 2005.

FIELD OF THE INVENTION

The invention relates to a device for varying the control times of an internal combustion engine having a drinking wheel which is drive-connected to a crankshaft, a driven element which is drive-connected to a camshaft, a swashplate mechanism which transmit the torque from the driving wheel to the driven element and which has at least one swashplate whose axial side faces are provided in each case one toothed rim.

BACKGROUND OF THE INVENTION

In internal combustion engines, camshafts are used for actuating the gas exchange valves. Camshafts are mounted in the internal combustion engine in such a way that cams attached to them bear against cam followers, for example bucket tappets, drag levers or rocker arms. When the camshaft is set in rotation, the cams roll on the cam followers which in turn actuate the gas exchange valves. Both the opening duration and amplitude but also the opening and closing time point of the gas exchange valves are defined by the position and shape of the cams.

Modern engine concepts tend toward a variable design of the valve drive. On the one hand, the valve stroke and valve opening duration are to be capable of being configured variably up to the complete cut-off of individual cylinders. For this purpose, concepts such as switchable cam followers, variable valve drives or electro-hydraulic or electric valve actuations are provided. Furthermore, it has proved advantageous to be able to exert influence on the opening and closing times for the gas exchange valves while the internal combustion engine is in operation. It is likewise desirable to be able to influence the opening and closing time points of the inlet and outlet valves separately so that, for example, a defined valve overlap can be set in a targeted manner. By the opening and closing time points of the gas exchange valves being set as a function of the current characteristic map range of the engine, for example of the current rotational speed or the current load, the specific fuel consumption can be lowered, the exhaust gas behavior can be positively influenced and the engine efficiency, maximum torque and maximum power can be increased.

The described variability in the gas exchange valve time control is brought about by means of a relative change in the phase position of the camshaft with respect to the crankshaft. Here, the camshaft is usually drive-connected to the crankshaft via a chain, belt or gearwheel mechanism or identically acting drive concepts. Between the chain, belt or gearwheel mechanism driven by the crankshaft and the camshaft is mounted a camshaft adjuster which transmits the torque from the crankshaft to the camshaft. Here, this device for varying the control times of the internal combustion engine is designed in such a way that, while the internal combustion engine is in operation, the phase position between the crankshaft and camshaft can be maintained reliably, and, if desired, the camshaft can be rotated within a certain angular range with respect to the crankshaft.

In internal combustion engines with a camshaft in each case for the inlet and the outlet valves, these may be equipped in each case with a camshaft adjuster. As a result, the opening and closing times of the inlet and outlet gas exchange valves can be displaced relative to one another in time and the valve time overlaps can be set in a targeted manner.

The seat of modern camshaft adjusters is generally located at the drive-side end of the camshaft. It is composed of a driving wheel which is fixed to the crankshaft, of a driven part which is fixed to the camshaft, and of an adjusting mechanism which transmits the torque from the driving wheel to the driven part. The driving wheel may be designed as a chain wheel, belt wheel or gearwheel and is connected fixedly in terms of rotation to the crankshaft by means of a chain, a belt or a gearwheel mechanism. The adjusting mechanism may be operated electromagnetically, hydraulically or pneumatically. It is likewise conceivable to attach the camshaft adjuster to an intermediate shaft or to mount it on a non-rotating component. In this case, the torque is transmitted to the camshafts via further drives.

Electrically operated camshaft adjusters are composed of a driving wheel which is drive-connected to the crankshaft of the internal combustion engine, of a driven part which is drive-connected to a camshaft of the internal combustion engine and of an adjusting mechanism. The adjusting mechanism is a three-shaft mechanism having three components which are rotatable with respect to one another. Here, the first component of the mechanism is connected fixedly in terms of rotation to the driving wheel and the second component is connected fixedly in terms of rotation to the driven part. The third component is designed, for example, as a toothed component, the rotational speed of which can be regulated via a shaft, for example by means of an electric motor or a braking device.

The torque is transmitted from the crankshaft to the first component and from there to the second component and consequently to the camshaft. This takes place either directly or with the third component being interposed.

By the rotational speed of the third component being suitably regulated, the first component can be rotated with respect to the second component, and consequently the phase position between the camshaft and crankshaft can be varied. Examples of three-shaft mechanisms of this type are inner eccentric mechanisms, double inner eccentric mechanisms, harmonic drives, swashplate mechanisms or the like.

To control the camshaft adjuster, sensors detect the characteristic data of the internal combustion engine such as for example the load state, the rotational speed and the angular positions of the camshaft and crankshaft. These data are fed to an electronic control unit which, after comparing the data with a characteristic map of the internal combustion engine, controls the adjusting motor of the camshaft adjuster.

DE 100 38 354 discloses a device for varying the control times of an internal combustion engine, in which the torque transmission from the crankshaft to the camshaft and the adjusting operation are implemented by means of a swashplate mechanism. The device consists substantially of a first bevel wheel which is fixed to the camshaft and has a first bevel wheel toothing, a second bevel wheel which is drive-connected to the crankshaft and has a second bevel wheel toothing, a swashplate and an adjusting shaft which is for example driven by an electric motor. The bevel wheels are arranged such that the bevel wheel toothings face one another in the axial direction. The swashplate which is mounted on the adjusting shaft is provided on its axial side faces with in each case one toothing and is arranged between the bevel wheels at a defined angle of incidence in such a way that the toothings of the swashplate engage in facing angular segments in the first and second bevel wheel toothing. Here, in the case of at least one of the toothed rim pairs, the toothings which engage into one another have different numbers of teeth.

A rotation of the adjusting shaft relative to the first or second bevel wheel leads to a wobbling rotation of the swashplate and consequently to a rotation of the engaged angular segments relative to the bevel wheels. On account of the different number of teeth of the toothings of a toothing pair, this leads to a relative rotation of the camshaft with respect to the crankshaft:

FIGS. 2 and 3 disclose a swashplate having a hub part and a toothing section which runs annularly around the hub part. The hub part is formed in one piece with the toothing section. An annular web extends outward in the radial direction from the hub part, which annular web runs out in a toothed section, with no teeth being formed in the region of the annular web. Furthermore, the teeth of the toothing section are of solid design, that is to say they extend in the axial direction from both axial side faces of the annular web.

On account of the solid design of the swashplate, said solution has the disadvantage of high rotating masses. Furthermore, the demand for axial installation space is relatively high.

OBJECT OF THE INVENTION

The object on which the invention is based is to provide a device for varying the control times of an internal combustion engine, wherein the mass of the rotating components and the installation space requirement should be reduced.

SUMMARY OF THE INVENTION

In a first embodiment of a device for varying the control times of gas exchange valves of an internal combustion engine, having a driving wheel which is drive-connected to the crankshaft, a driven element which is drive-connected to the camshaft and a swashplate mechanism which transmits the torque from the driving wheel to the driven element, with the swashplate mechanism containing a swashplate which has a hub part and a toothing section which runs annularly around the hub part, and with a toothed rim being formed on at least one axial side face of the toothing section, the object is achieved according to the invention in that at least one tooth of the toothed rim directly adjoins the hub part in the radial direction. Here, it can be provided that the hub part is formed in one piece with the toothing section or that the hub part and the toothing section are produced in each case separately and are connected to one another in a force-fitting, form-fitting, frictionally engaging or materially joined manner.

In this embodiment, at least a part of the teeth of the toothing section of the swashplate extends in the radial direction along the entire toothing section. All the teeth of the toothing are advantageously designed in this way. In the two-part embodiment, the radially inner end faces of the teeth of the toothing section can bear against the outer lateral surfaces of the hub part or, for example in the case of force-fitting fastening, be incorporated in the connection.

In the single-part embodiment, the teeth run out at the hub part. Suitable production methods for said embodiment are for example axial rolling, tumble-pressing, forging, extrusion or sintering. In contrast to the solution known from the prior art, it is obtained that the bending moments acting on the swash wheel are supported not only by the annular web which carries the toothing but also additionally by the teeth. As a result of the increased bending resistance moment which is obtained in this way, the swashplate can be of narrower design in the axial direction, as a result of which the required axial installation space and the weight of the device are reduced.

In a second embodiment of a device for varying the control times of an internal combustion engine, having a driving wheel which is drive-connected to a crankshaft, a driven element which is drive-connected to a camshaft, and a swashplate mechanism which transmits the torque from the driving wheel to the driven element and which has the following: a bevel wheel which is provided with a toothed rim and a swashplate which is provided with a toothed rim, with the toothed rims engaging into one another along an angular range, the object is achieved according to the invention in that at least one of the toothed components is composed of a lightweight material or a composite of lightweight materials.

The lightweight material(s) can be selected inter alia from the group comprising sintered steel, aluminum or plastic or combinations thereof.

In addition to the loadings which are caused by the transmission of torque from the crankshaft to the camshaft, the components of the device, specifically the toothed components, the swashplate and the bevel wheels, must additionally withstand the loadings caused by the alternating torques of the camshaft. For this reason, high-strength and therefore heavy and expensive materials, in particular steels, are used for these components. The high weight and therefore the high moment of inertia of the masses rotating at the rotational speed of the camshaft lead to considerably increased fuel consumption.

It is possible by means of strength-increasing measures, for example on the basis of geometric modifications to the components as are for example proposed in the first embodiment, to resort to "softer" materials. Here, the use of said materials (plastic aluminum or sintered steel or a composite having said materials) represents a weight-optimized solution.

In a third embodiment of a device for varying the control times of an internal combustion engine, having a driving wheel which is drive-connected to a crankshaft, a driven element which is drive-connected to a camshaft, and a swashplate mechanism which transmits the torque from the driving wheel to the driven element and which has at least one swashplate whose axial side faces are provided with in each case one toothed rim, the object according to the invention is achieved in that the two toothed rims of the swashplate are composed of a common toothing, with a tooth of one toothed rim forming a spacewidth of the other toothed rim and vice versa.

Instead of providing a toothing which is formed on a solid annular web, the toothing should in this embodiment be sinusoidal in the drive direction. The teeth of the toothing are thus designed to be hollow in this case. This can for example be realized proceeding from a circular or annular disk by means of forcing through the teeth of a radially outer region of the disk, that is to say by means of shaping, in particular non-cutting, processes. If plastic or sintered steel is used as material, then the profile can be obtained in the original shaping process by means of a corresponding design of the molding tool, for example of the injection mold or the like.

This measure likewise leads to a considerable weight reduction of the device and therefore of the rotating masses.

BRIEF DESCRIPTION OF THE DRAWINGS

Further features of the invention may be gathered from the following description and the accompanying drawings which schematically illustrate exemplary embodiments of the invention and in which.

DETAILED DESCRIPTION OF THE INVENTION

Figure 1:
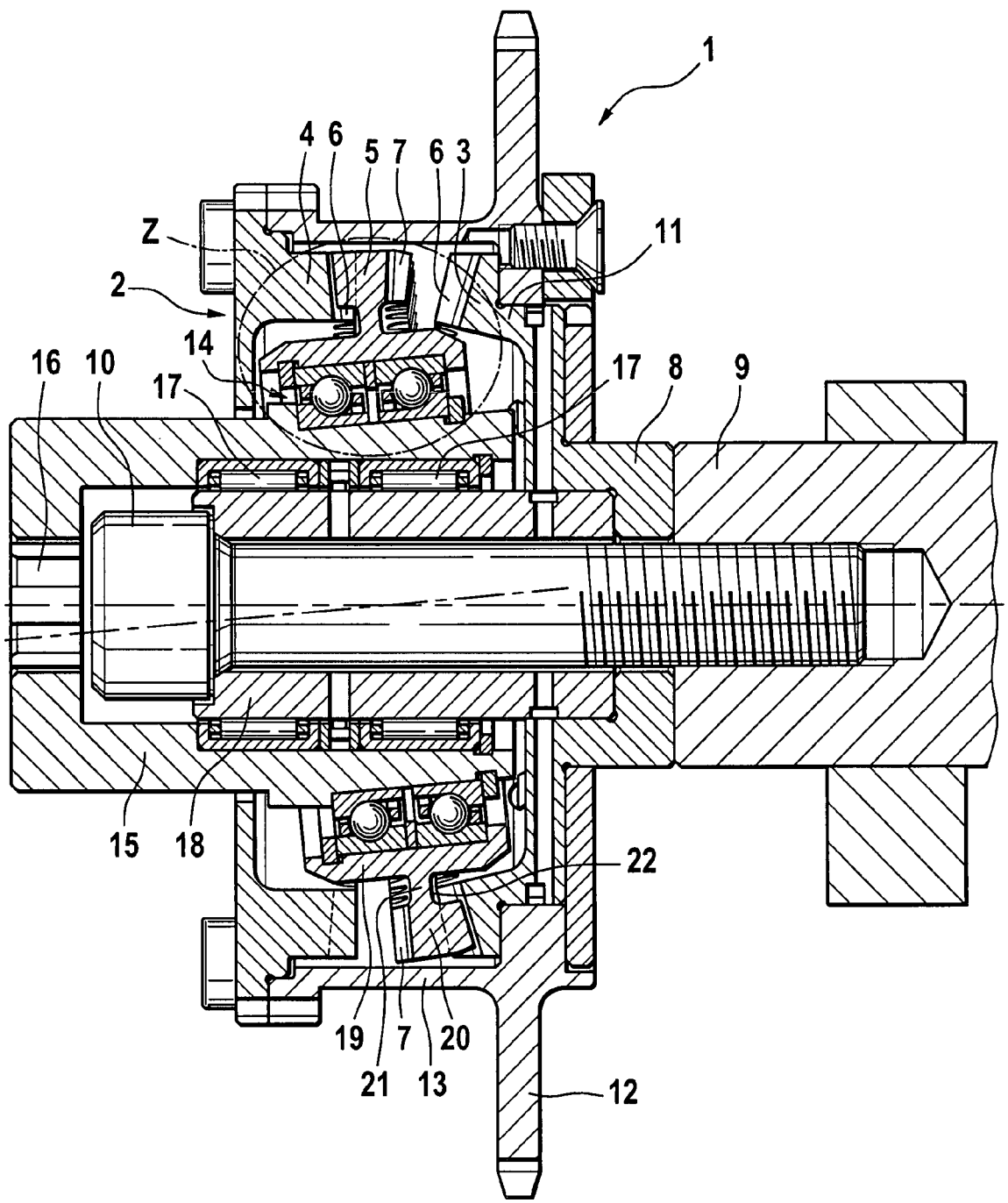
FIG. 1 shows a longitudinal section through an embodiment according to the invention of a device for varying the control times of an internal combustion engine.
Figure 1A:
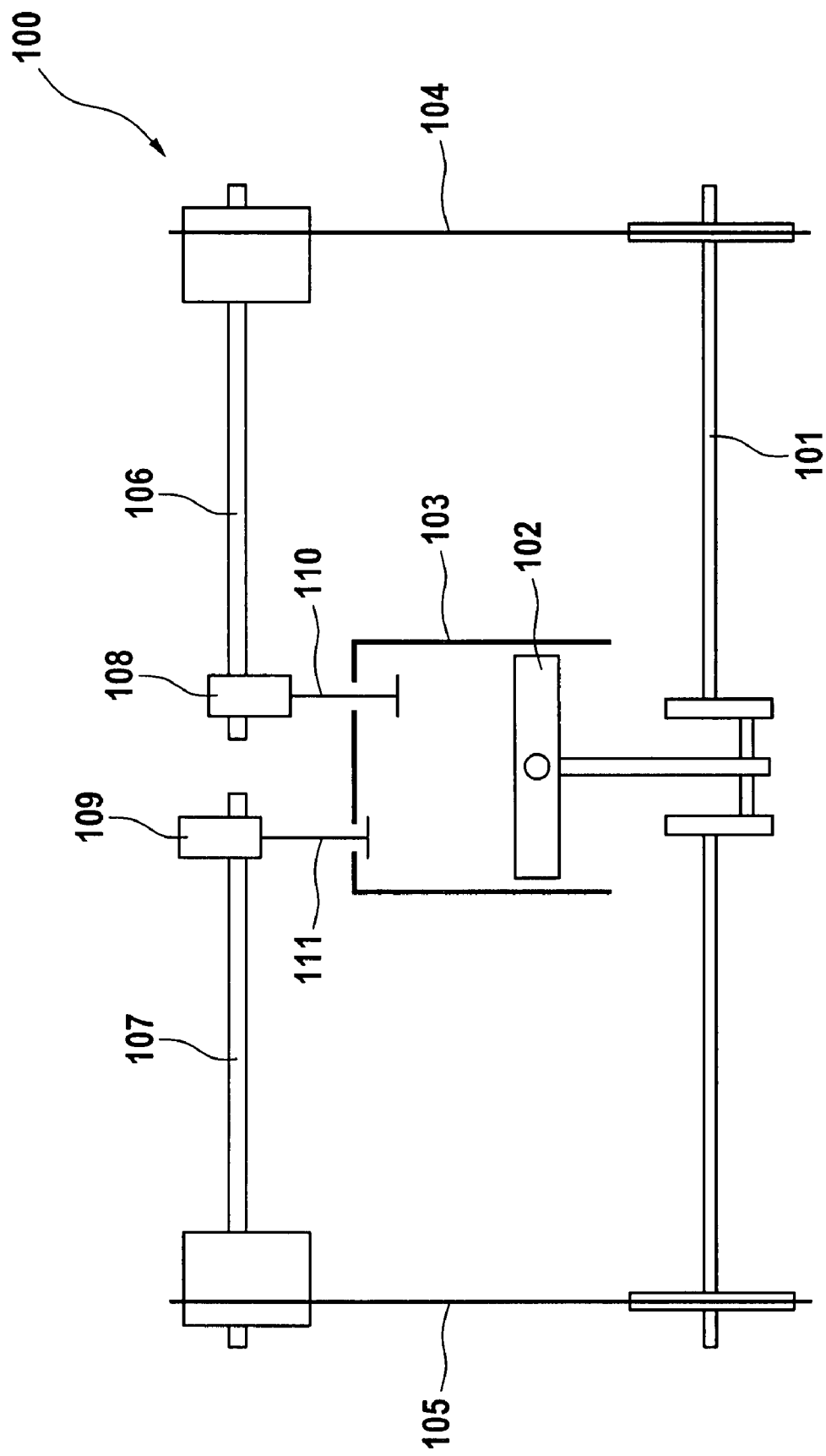
FIG. 1a shows an internal combustion engine only highly schematically.

An internal combustion engine 100 is outlined in FIG. 1a, with a piston 102 seated on a crankshaft 101 being indicated in a cylinder 103. In the embodiment illustrated, the crankshaft 101 is connected, in each case via a traction mechanism 104 and 105, to an inlet camshaft 106 and an outlet camshaft 107, with a first and a second device 1 being capable of ensuring a relative rotation between the crankshaft 101 and camshafts 106, 107. Cams 108, 109 of the camshafts 106, 107 actuate an inlet gas exchange valve 110 and the outlet gas exchange valve 111.

FIG. 1 shows an embodiment of a device 1 according to the invention for varying the control times of an internal combustion engine 100. The device 1 comprises inter alia a swashplate mechanism 2, composed of a first bevel wheel 3, of a second bevel wheel 4 and of a swashplate 5. A first toothed rim 6 designed as a bevel wheel toothing is formed on the first bevel wheel 3. The swashplate 5 is formed with two second toothed rims 7, which are designed as bevel wheel toothings, with in each case one second toothed rim 7 being arranged on an axial side face of the swashplate 5. Similarly to the first bevel wheel 3, the second bevel wheel 4 has a first toothed rim 6 designed as a bevel wheel toothing. The first bevel wheel 3 is connected fixedly in terms of rotation, by means of a driven element 8 which is formed in one piece with it, to a camshaft 9. The connection between the driven element 8 and the camshaft 9 can be realized by means of a materially joined, force-fitting, frictionally engaging or form-fitting connection. In the exemplary embodiment illustrated, the driven element 8 is fastened to the camshaft 9 by means of a fastening screw 10.

The driven element 8 is of pot-shaped design, with an annular section 11 serving as a radial bearing point for a driving wheel 12 which is embodied in the illustrated embodiment as a sprocket. The driving wheel 12 is operatively connected to a primary drive (not illustrated), by means of which a torque is transmitted from the crankshaft 101 to the driving wheel 12. A primary drive of said type can for example be a chain drive, belt drive or gearwheel drive. The driving wheel 12 is connected fixedly in terms of rotation to a cylindrical housing 13 which is in turn connected fixedly in terms of rotation to the second bevel wheel 4. The connection of the components can be realized by means of force-fitting, form-fitting, frictionally engaging or materially joined connections. Also conceivable is a single-part design of the components, as illustrated in FIG. 1.

The two bevel wheels 3, 4 stand parallel to one another and are spaced apart from one another in the axial direction. Together with the housing 13, the bevel wheels 3, 4 and the driven element 8 form an annular cavity in which the swashplate 5 is arranged. By means of first rolling bearings 14, the swashplate 5 is mounted on an adjusting shaft 15 at a defined angle of incidence with respect to the bevel wheels 3, 4. The adjusting shaft 15, which is of substantially pot-shaped design, is provided with a coupling element 16 into which engages a shaft (not illustrated) of a device (likewise not illustrated) by means of which the rotational speed of the adjusting shaft 15 can be regulated. The adjusting shaft 15 is supported via a second rolling bearing 17 on a shaft 18 which is connected fixedly in terms of rotation to the camshaft 9 and is designed in the present embodiment as a hollow shaft 18. It is likewise conceivable to mount the adjusting shaft 15 on the screw head of the fastening screw 10 and/or to mount the swashplate 5 on the adjusting shaft 15 by means of a plain bearing.

The swashplate 5 which is arranged at a defined angle of incidence on the adjusting shaft 15 engages with the second toothed rim 7 into the first toothed rim 6 of the first bevel wheel 3 and with the other second toothed rim 7 into the first toothed rim 6 of the second bevel wheel 4. Here, the respective toothed rims 6, 7 are in engagement in each case only in a specific angular range which is dependent on the angle of incidence of the swashplate 5.

By means of the engagement of the toothed rims 6, 7, the torque of the crankshaft 101, transmitted from the primary drive to the driving wheel 12 and from there to the second bevel wheel 4, is transmitted via the swashplate 5 to the first bevel wheel 3 and consequently via the driven element 8 to the camshaft 9.

In order to keep the phase position between the camshaft 9 and crankshaft 101 constant, the adjusting shaft 15 is driven at the rotational speed of the driving wheel 12. If the phase position is to be changed, the rotational speed of the adjusting shaft 15 is increased or reduced depending on whether the camshaft 9 is to lead or lag in relation to the crankshaft 101. As a result of the deviating rotational speed of the adjusting shaft 15, the swashplate 5 executes a wobbling rotation, with the angular ranges in which the toothed rims 6, 7 engage one in the other rotating around the bevel wheels 3, 4. In the case of at least one of the pairs of toothed rims, the two toothed rims 6, 7 engaging one in the other have different numbers of teeth. When the angular ranges in which the toothed rims 6, 7 engage one in the other have rotated once completely, this results, on account of the difference in the number of teeth, in an adjustment of the first with respect to the second bevel wheel 3, 4 and consequently of the camshaft 9 in relation to the crankshaft 101. The adjustment angle corresponds to the range occupied by the teeth forming the difference in the number of teeth.

It is conceivable, in this respect, that the toothed rims 6, 7 of the two pairs of toothed rims have different numbers of teeth. The adjustment reduction ratio consequently arises from the two resulting reduction ratios.

It is likewise conceivable that the toothed rims 6, 7 of only one pairing of toothed rims have different numbers of teeth. In this case, the reduction ratio arises only from this reduction. In this case, the other pairing of toothed rims serves merely as coupling means with a reduction ratio of 1:1 between the swashplate 5 and the respective component. In this case, it is likewise conceivable that a pin coupling is provided as a coupling means instead of the second pair of toothed rims, with pins which are attached to or integrally formed on the swashplate 5 or on the driving wheel 12/driven element 8 engaging in axially running grooves of the in each case other component.

In the embodiment illustrated in FIG. 1, the swashplate 5 and/or at least one of the bevel wheels 3, 4 is produced from a lightweight material, for example aluminum, sintered steel or of a plastic. The use of a lightweight material reduces the mass and therefore the moment of inertia of the device 1 which rotates at the rotational speed of the camshaft, which leads to considerable fuel savings.

Figure 2A:
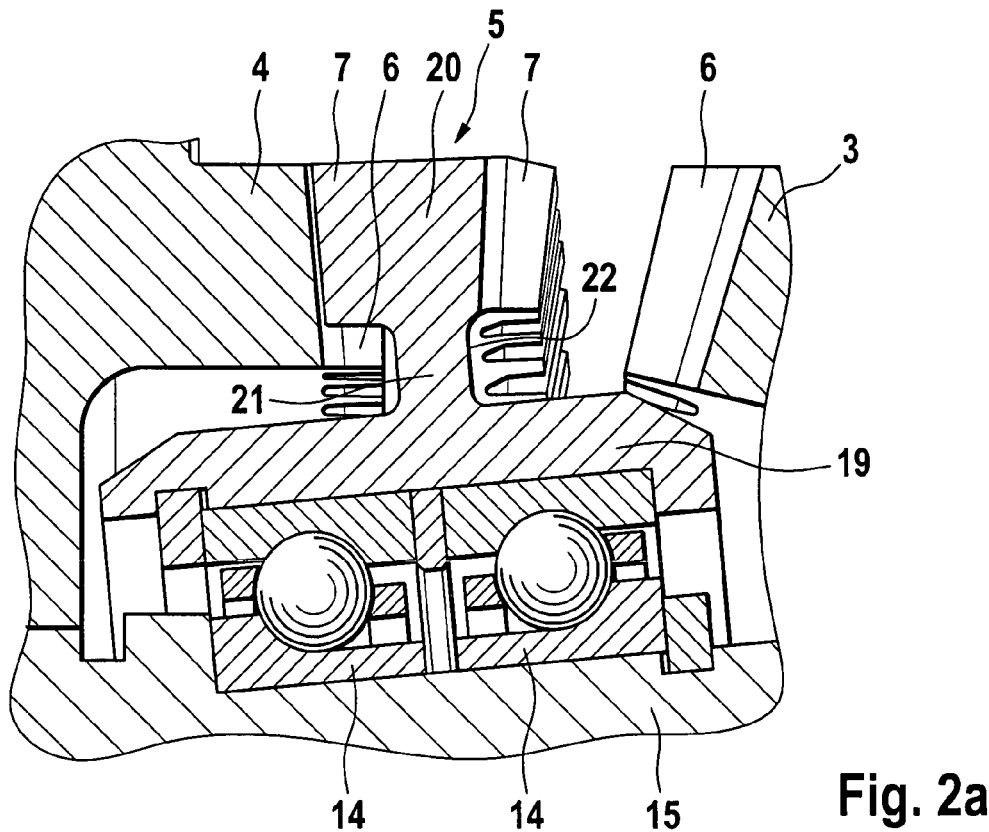
FIG. 2a shows an enlarged illustration of the detail Z from FIG. 1.

FIG. 2a shows the detail Z from FIG. 1. Said figure illustrates the swashplate 5 which is mounted by means of the first rolling bearing 14 on the adjustment shaft 15. The swashplate 5 is composed of a hub part 19 and a toothing section 20, with the latter containing an annular web 21 on which the two second toothed rims 7 are formed. In the exemplary embodiment illustrated, the hub part 19 is formed in one piece with the toothing section 20. Also conceivable is an embodiment in which the hub part 19 and the toothing section 20 are produced separately and are connected in a force-fitting, frictionally engaging, form-fitting or materially joined manner.

Figure 2B:
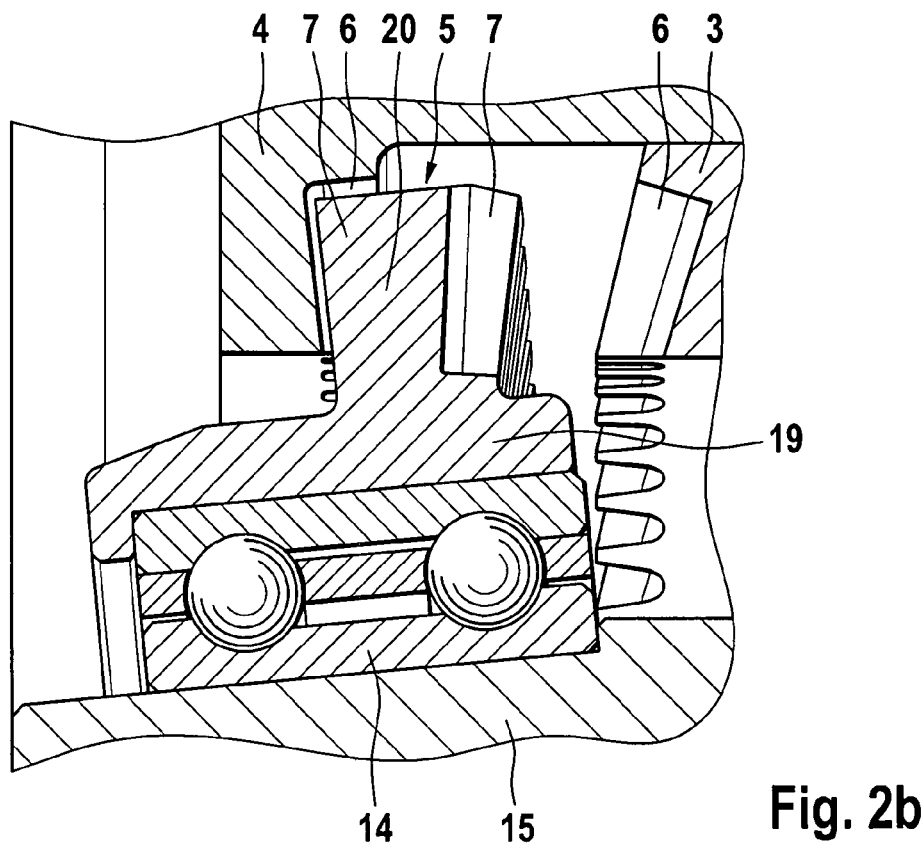
FIG. 2b shows an enlarged illustration of the detail Z from FIG. 1 of a second embodiment according to the invention.

The toothing of the toothing part 20 extends, in FIG. 2a, proceeding from the radially outer edge of the swashplate 5 in the direction of the hub part 19, with the toothing not running out in the hub part 19. Moreover, an annular gap 22 is provided between the radially inner end of the toothing and the hub part 19. FIG. 2b shows, similarly to FIG. 2a, the detail Z of a second embodiment according to the invention of a device 1. The components are largely identical. However, the toothing of the two second toothed rims 7 runs out in the hub part 19. No annular gap 22 is provided here between the radially inner end of the toothing and the hub part 19. It is likewise conceivable for the teeth of only one toothed rim 7 to run out in the hub part 19. On account of the toothing, which merges into the hub part 19, of the second toothed rims 7, the bending resistance moment of the swashplate 5 is increased. The swashplate 5 can, for the same bending resistance moment, be of narrower design in the radial direction than a swashplate 5 as per FIG. 2a. This results in installation space and weight advantages.

Figure 3:
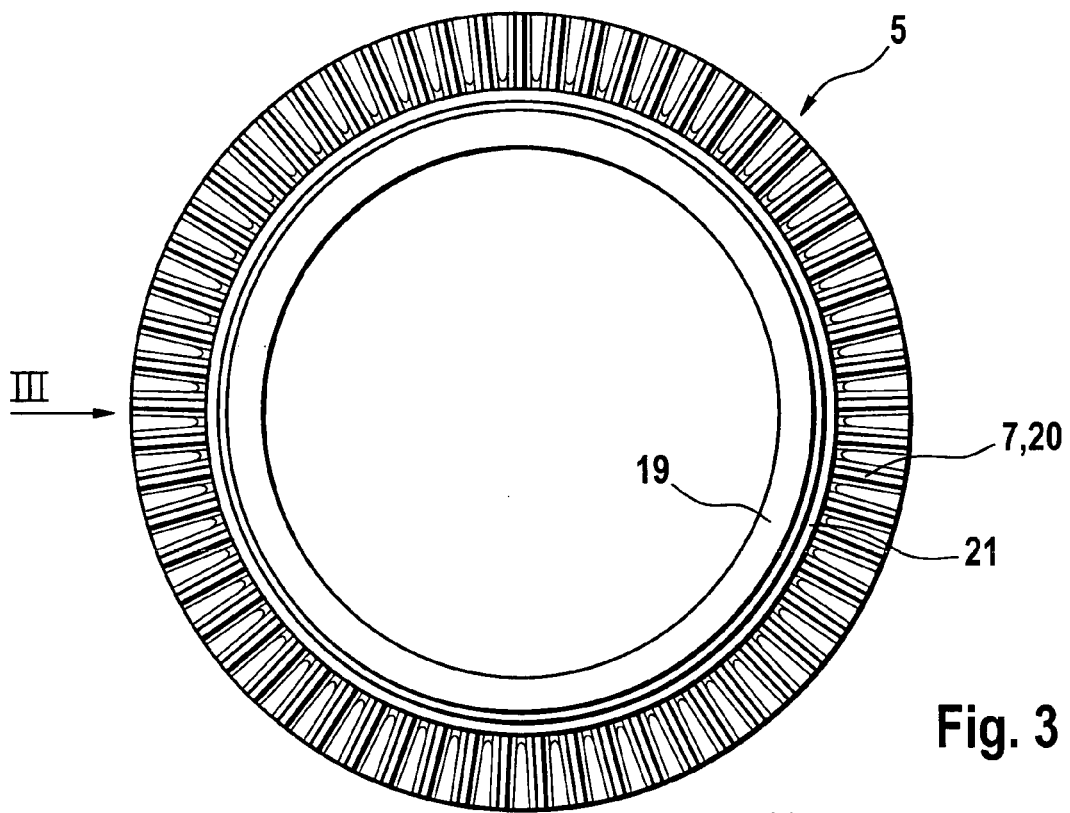
FIG. 3 shows a front view of a swashplate.
Figure 3A:
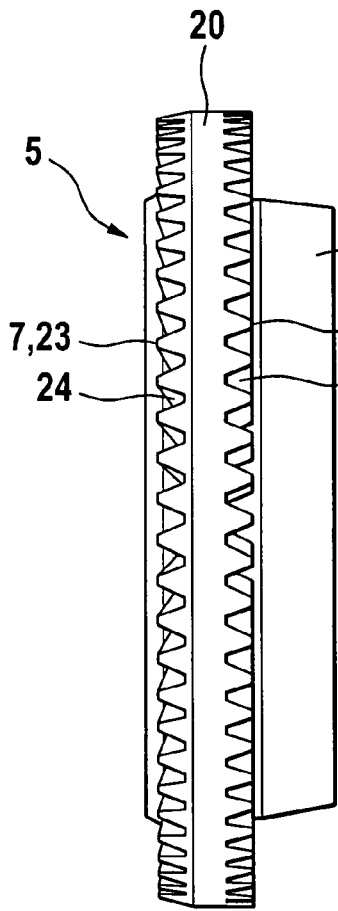
FIG. 3a shows a plan view of a first embodiment of a swashplate along the arrow III.
Figure 3B:
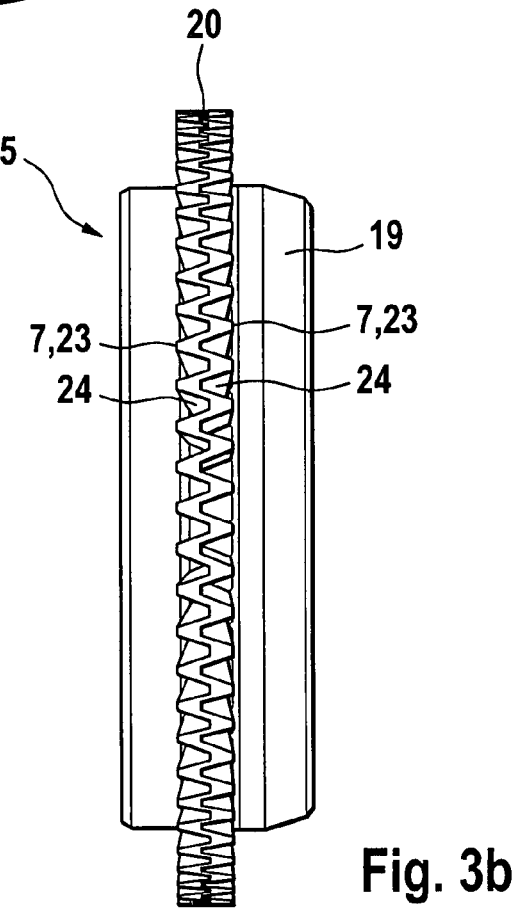
FIG. 3b shows a plan view of a second embodiment of a swashplate along the arrow III.

FIG. 3 shows a swashplate 5 in a front view. FIGS. 3a and 3b show plan views of two different embodiments along the arrow Ill.

FIG. 3a shows a plan view of the swashplate 5 along the arrow III of the swashplate 5 illustrated in FIG. 1. Proceeding from the annular web 21, the teeth 23 of the second toothed rim 7 extend in the axial direction to both sides. On account of the solid design of the swashplate 5, its mass is relatively high.

FIG. 3b shows a plan view, along the arrow III, of the swashplate 5 which is used in a third embodiment according to the invention of the device 1. In this embodiment, the teeth 23 are of hollow design. Each spacewidth 24 of a second toothed rim 7 simultaneously forms a tooth 23 of the other toothed rim 7 and vice versa. This can for example be obtained by the adaptation of the casting mold in the case of plastic swashplates 5, by adapting the pressing tool when using sintered steel or by forcing through the teeth 23 from a disk-shaped base body. It is possible in this way for swashplates 5 to be produced cost-effectively for example by means of non-cutting shaping of a sheet metal part. In comparison to the embodiment of FIG. 3a, the embodiment illustrated in FIG. 3b is lighter and is shorter in the axial direction.

The use of the toothing illustrated in FIG. 3a is of course not restricted to the second toothed rims 7 of the swashplate 5. Moreover, a similar design of the first toothed rims 6 of the bevel wheels 3, 4 is likewise possible.

It finally remains to be noted that combinations of the different embodiments are of course conceivable. For example, the use of lightweight materials for the swashplate 5 with the toothing, which runs out in the hub part 19, of the second toothed rims 7, lightweight materials and hollow teeth 23, or hollow teeth 23 which are formed on the swashplate 5 and run out in the hub part 19.

The invention claimed is:

1. A device for varying the control times of an internal combustion engine, having
a driving wheel which is drive-connected to a crankshaft,
a driven element which is drive-connected to a camshaft, and
a swashplate mechanism which transmits the torque from the driving wheel to the driven element,
and which has at least one swashplate whose axial side faces are provided with in each case one toothed rim, wherein
the two toothed rims of the swashplate are composed of a common toothing, with a tooth of one toothed rim forming a spacewidth of the other toothed rim and vice versa.

\* \* \* \* \*